(12) United States Patent
Cho et al.

(10) Patent No.: US 10,023,042 B2
(45) Date of Patent: Jul. 17, 2018

(54) POWER TRANSMISSION APPARATUS FOR VEHICLE

(71) Applicant: Hyundai Motor Company, Seoul (KR)

(72) Inventors: Wonmin Cho, Hwaseong-si (KR); Seong Wook Hwang, Gunpo-si (KR); Yong Uk Shin, Suwon-si (KR); Seongwook Ji, Gunpo-si (KR); Woochurl Son, Seongnam-si (KR); Hyun Sik Kwon, Seoul (KR); Ki Been Lim, Yongin-si (KR); Woo Jin Chang, Suwon-si (KR); Jae Chang Kook, Hwaseong-si (KR); Ki Tae Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 15/280,230

(22) Filed: Sep. 29, 2016

(65) Prior Publication Data
US 2017/0166042 A1    Jun. 15, 2017

(30) Foreign Application Priority Data
Dec. 14, 2015 (KR) .......................... 10-2015-0178590

(51) Int. Cl.
*F16H 3/66* (2006.01)
*B60K 6/547* (2007.10)
(Continued)

(52) U.S. Cl.
CPC ................ *B60K 6/547* (2013.01); *B60K 6/38* (2013.01); *B60K 6/485* (2013.01); *F16H 3/006* (2013.01);
(Continued)

(58) Field of Classification Search
CPC . F16H 3/006; F16H 3/091; F16H 3/66; F16H 3/663; F16H 3/724; F16H 37/065;
(Continued)

(56) References Cited

U.S. PATENT DOCUMENTS 4,856,375 A * 8/1989 Beim ...................... F16H 3/091
                                                    192/13 A
8,657,712 B2 * 2/2014 Tamai ..................... F16H 3/728
                                                    475/302
(Continued)

FOREIGN PATENT DOCUMENTS

EP        0 845 618 A2    6/1998
KR        10-0852044 B1   8/2008
(Continued)

*Primary Examiner* — Derek D Knight
*Assistant Examiner* — David R Morris
(74) *Attorney, Agent, or Firm* — Morgan, Lewis & Bockius LLP

(57) ABSTRACT

A power transmission apparatus for a vehicle may include a first input shaft directly connected to an engine, a second input shaft selectively receiving torque of the engine through a first clutch, a third input shaft selectively receiving the torque of the engine through a second clutch, an intermediate shaft disposed in parallel with the first, second, and third input shafts, a transfer gear fixedly disposed on the intermediate shaft, an first shifting member outputting first and second preliminarily shifted torques, an second shifting member outputting third and fourth preliminarily shifted torques, a third shifting member outputting eight forward speed stage stages and one reverse speed stage, and an auxiliary power source disposed on a supply of the torque transmitted from the first shifting member and the second shifting member to the third shifting member and supplying torque to the third shifting member.

19 Claims, 10 Drawing Sheets

(51) Int. Cl.
*F16H 3/72* (2006.01)
*F16H 3/00* (2006.01)
*F16H 3/091* (2006.01)
*F16H 37/06* (2006.01)
*B60K 6/38* (2007.10)
*B60K 6/485* (2007.10)

(52) U.S. Cl.
CPC ............... *F16H 3/091* (2013.01); *F16H 3/66* (2013.01); *F16H 3/663* (2013.01); *F16H 3/724* (2013.01); *F16H 37/065* (2013.01); *B60K 2006/381* (2013.01); *B60Y 2200/92* (2013.01); *B60Y 2300/19* (2013.01); *B60Y 2400/73* (2013.01); *F16H 2200/006* (2013.01); *F16H 2200/0021* (2013.01); *F16H 2200/2007* (2013.01); *F16H 2200/2035* (2013.01); *Y10S 903/911* (2013.01)

(58) Field of Classification Search
CPC ....... F16H 2200/0021; F16H 2200/006; F16H 2200/2007; F16H 2200/2035; F16H 2200/2041; F16H 2200/2064; F16H 2200/2094
See application file for complete search history.

(56) References Cited

U.S. PATENT DOCUMENTS

| | | | | |
|---|---|---|---|---|
| 8,790,202 | B2* | 7/2014 | Sakai | B60K 6/365 475/5 |
| 9,835,237 | B2* | 12/2017 | Hwang | F16H 37/042 |
| 2012/0021861 | A1 | 1/2012 | Sakai et al. | |
| 2012/0065016 | A1 | 3/2012 | Tamai et al. | |
| 2017/0152927 | A1* | 6/2017 | Hwang | F16H 3/006 |
| 2017/0159779 | A1* | 6/2017 | Hwang | F16H 37/042 |

FOREIGN PATENT DOCUMENTS

KR  10-2014-0133112 A  11/2014
KR  10-2015-0071605 A   6/2015

\* cited by examiner

FIG. 2

| Speed stages | CL1 | CL2 | CL3 | BK | SL1 D1/7 | SL1 N | SL1 D3/5 | SL2 D2/6 | SL2 N | SL2 D8/R | Hybrid control<br>Driving motor / generator (torque assist) |
|---|---|---|---|---|---|---|---|---|---|---|---|
| REV | △ | | | ● | | ● | | | | ● | |
| N   |   | | | ● | | ● | | | ● | | |
| D1  |   | △ | | ● | ● | | | | ● | | |
| D2  |   | | | ● | | ● | | ● | | | |
| D3  |   | △ | | ● | | | ● | | ● | | |
| D4  |   | | ● | | | ● | | | ● | | |
| D5  |   | △ | ● | | | | ● | | ● | | |
| D6  |   | | ● | | | ● | | ● | | | |
| D7  | △ | | ● | | ● | | | | ● | | |
| D8  | △ | | ● | | | | | | | ● | |

POWER TRANSMISSION APPARATUS FOR VEHICLE

CROSS-REFERENCE TO RELATED APPLICATION

The present application claims priority to Korean Patent Application No. 10-2015-0178590, filed Dec. 14, 2015, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle that realizes eight forward speed stages and one reverse speed stage using two synchronizers and two planetary gear sets.

Description of Related Art

Environmental friendliness of vehicles is very important and survival of future motor industry is dependent on this. Vehicle makers are focusing on development of environmentally-friendly vehicles so as to meet environment and fuel consumption regulations.

Some examples of such environmentally-friendly vehicles include an electric vehicle (EV) and a hybrid electric vehicle (HEV) that use electrical energy, and a double clutch transmission (DCT) that improves efficiency and convenience.

The DCT includes two clutch devices and a gear train of a manual transmission. The DCT selectively transmits torque input from an engine to two input shafts through two clutches, changes the torque selectively transmitted to the two input shafts through the gear train, and outputs the changed torque.

The DCT is used to realize a compact transmission achieving a forward speed stage higher than a fifth forward speed stage. The DCT is used as an automated manual transmission that does not require a driver's manual manipulation by controlling two clutches and synchronizing devices by a controller.

Compared with an automatic transmission with planetary gear sets, the DCT has excellent power delivery efficiency, simplifies change and addition of components for achieving multiple gear stages, and improves fuel economy.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of achieving eight forward speed stages and a reverse speed stage, realizing multiple speed stages, and improving fuel economy by adding two planetary gear sets to a DCT including two synchronizers.

Various aspects of the present invention are additionally directed to providing a power transmission apparatus for a vehicle having further advantages of simplifying an interior layout and minimizing weight of the power transmission apparatus by reducing the number of components, and of improving fuel economy by achieving eight forward speed stages and one reverse speed stage with two synchronizers and two planetary gear sets.

Furthermore, various aspects of the present invention are directed to providing a power transmission apparatus for a vehicle having further advantages of assisting torque at every speed stage by using one motor/generator.

According to various aspects of the present invention, a power transmission apparatus for a vehicle may include a first input shaft directly connected to an engine, a second input shaft surrounding the first input shaft without rotational interference with the first input shaft and selectively receiving torque of the engine through a first clutch, a third input shaft surrounding the second input shaft without rotational interference with the second input shaft and selectively receiving the torque of the engine through a second clutch, an intermediate shaft disposed in parallel with the first, second, and third input shafts, a transfer gear fixedly disposed on the intermediate shaft and outputting torque of the intermediate shaft, an first shifting member receiving the torque of the engine from the third input shaft, changing the torque of the engine into first and second preliminarily shifted torques, and outputting the first and second preliminarily shifted torques, an second shifting member receiving the torque of the engine from the second input shaft, changing the torque of the engine into third and fourth preliminarily shifted torques, and outputting the third and fourth preliminarily shifted torques, a third shifting member changing the torque of the engine directly transmitted from the first input shaft and the first preliminarily shifted torque to the fourth preliminarily shifted torque selectively transmitted from the first shifting member or the second shifting member into eight forward speed stage stages and one reverse speed stage, and outputting the eight forward speed stage stages and the one reverse speed stage, and an auxiliary power source disposed on a supply of the torque transmitted from the first shifting member and the second shifting member to the third shifting member and configured to supply torque to the third shifting member.

The first shifting member may include a 1/7 drive gear and a 3/5 drive gear fixedly disposed on the third input shaft, a 1/7 driven gear rotatably disposed on the intermediate shaft and engaged with the 1/7 drive gear, a 3/5 driven gear rotatably disposed on the intermediate shaft and engaged with the 3/5 drive gear, and a first synchronizer operably connecting at least one of the 1/7 driven gear and the 3/5 driven gear to the intermediate shaft selectively.

The first shifting member may include a 1/7 drive gear and a 3/5 drive gear rotatably disposed on the third input shaft, a first synchronizer operably connecting at least one of the 1/7 drive gear and the 3/5 drive gear to the third input shaft selectively, a 1/7 driven gear fixedly disposed on the intermediate shaft and engaged with the 1/7 drive gear, and a 3/5 driven gear fixedly disposed on the intermediate shaft and engaged with the 3/5 drive gear.

The second shifting member may include an 8/R drive gear rotatably disposed on the second input shaft, a 2/6 drive gear rotatably disposed on the second input shaft and engaged with the transfer gear on the intermediate shaft, a second synchronizer operably connecting the 8/R drive gear or the 2/6 drive gear to the second input shaft selectively, and an 8/R driven gear fixedly disposed on the intermediate shaft and operably connected to the 8/R drive gear through an idle gear.

The auxiliary power source may include a motor/generator having a motor shaft drive gear and the motor shaft drive gear may be engaged with the 2/6 drive gear of the second shifting member.

The auxiliary power source may include a motor/generator having a motor shaft drive gear and a motor shaft driven gear, and the motor shaft drive gear may be engaged with the motor shaft driven gear fixedly disposed on the intermediate shaft.

The auxiliary power source may include a motor/generator having a motor shaft drive gear and the motor shaft drive gear may be engaged with the transfer gear fixedly disposed on the intermediate shaft.

The third shifting member may include a first planetary gear set including a first sun gear, a first planet carrier, and a first ring gear as rotation elements thereof;

a second planetary gear set including a second sun gear, a second planet carrier, and a second ring gear as rotation elements thereof, four rotation shafts directly connected to at least one rotation element among the rotation elements of the first planetary gear set and the second planetary gear set, and frictional elements, at least one of the frictional elements selectively connecting at least one rotation shaft among the four rotation shafts to the first input shaft or selectively connecting one rotation element of the first planetary gear set to one rotation element of the second planetary gear set, and another of the frictional elements selectively connecting another rotation shaft among the four rotation shafts to a transmission housing.

Each of the first planetary gear set and the second planetary gear set may be a single pinion planetary gear set, and the four rotation shafts may include a first rotation shaft directly connecting the first sun gear with the second sun gear and receiving torque from the first shifting member and the second shifting member, a second rotation shaft directly connected to the second planet carrier and directly connected to the first input shaft, a third rotation shaft directly connected to the first planet carrier, directly connected to an output shaft, and selectively connectable to the second ring gear, and a fourth rotation shaft directly connected to the first ring gear and selectively connectable to the transmission housing.

The frictional elements may include a third clutch disposed between the first planet carrier and the second ring gear, and a brake disposed between the fourth rotation shaft and the transmission housing.

The power transmission apparatus of claim 8, wherein each of the first planetary gear set and the second planetary gear set is a single pinion planetary gear set, and the four rotation shafts may include a first rotation shaft directly connecting the first sun gear to the second sun gear and receiving torque from the first shifting member and the second shifting member, a second rotation shaft directly connected to the second planet carrier and selectively connectable to the first input shaft, a third rotation shaft directly connecting the first planet carrier to the second ring gear and directly connected to an output shaft, and a fourth rotation shaft directly connected to the first ring gear and selectively connectable to the transmission housing.

The frictional elements may include a third clutch disposed between the first input shaft and the second rotation shaft, and a brake disposed between the fourth rotation shaft and the transmission housing.

Each of the first planetary gear set and the second planetary gear set may be a single pinion planetary gear set, and the four rotation shafts may include a first rotation shaft directly connected to the first sun gear, selectively connectable to the second sun gear, and receiving torque from the first shifting member and the second shifting member, a second rotation shaft directly connected to the second planet carrier and directly connected to the first input shaft, a third rotation shaft directly connecting the first planet carrier to the second ring gear and directly connected to an output shaft, and a fourth rotation shaft directly connected to the first ring gear and selectively connectable to the transmission housing.

The frictional elements may include a third clutch disposed between the first sun gear and the second sun gear, and a brake disposed between the fourth rotation shaft and the transmission housing.

Each of the first planetary gear set and the second planetary gear set may be a single pinion planetary gear set, and the four rotation shafts may include a first rotation shaft directly connected to the first sun gear and receiving torque from the first shifting member and the second shifting member, a second rotation shaft directly connecting the first planet carrier to the second ring gear and selectively connectable to the first input shaft, a third rotation shaft directly connecting the first ring gear to the second planet carrier and directly connected to an output shaft, and a fourth rotation shaft directly connected to the second sun gear and selectively connectable to the transmission housing.

The frictional elements may include a third clutch disposed between the first input shaft and the second rotation shaft, and a brake disposed between the fourth rotation shaft and the transmission housing.

The third shifting member may be a Ravingneaux compound planetary gear set in which a single pinion planetary gear set and a double pinion planetary gear set are combined with each other to use a planet carrier and a ring gear in common, and the third shifting member may include four rotation shafts, and frictional elements, at least one of the frictional elements selectively connecting at least one rotation shaft among the four rotation shafts to the first input shaft, and another of the frictional elements selectively connecting another rotation shaft among the four rotation shafts to a transmission housing.

The four rotation shafts may include a first rotation shaft directly connected to a sun gear of the single pinion planetary gear set and receiving torque from the first shifting member and the second shifting member, a second rotation shaft directly connected to a common planet carrier and selectively connectable to the first input shaft, a third rotation shaft directly connected to a common ring gear and directly connected to an output shaft, and a fourth rotation shaft directly connected to a sun gear of the double pinion planetary gear set and selectively connectable to the transmission housing.

The frictional elements may include a third clutch disposed between the first input shaft and the second rotation shaft, and a brake disposed between the fourth rotation shaft and the transmission housing.

The various embodiments of the present invention may achieve one reverse speed stage and eight forward speed stages by adding two planetary gear sets to a DCT provided with two synchronizers. Therefore, multiple speed stages are achieved and fuel economy is improved.

In addition, an interior layout may be simplified, length and weight of the DCT may be minimized by reducing the number of components.

Furthermore, since even-numbered speed stages and odd-numbered speed stages are achieved by turns by alternately operating two clutches, smooth shift may be achieved.

Additionally, torque can be assisted at every speed stages by using one motor/generator.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of a power transmission apparatus for a vehicle according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
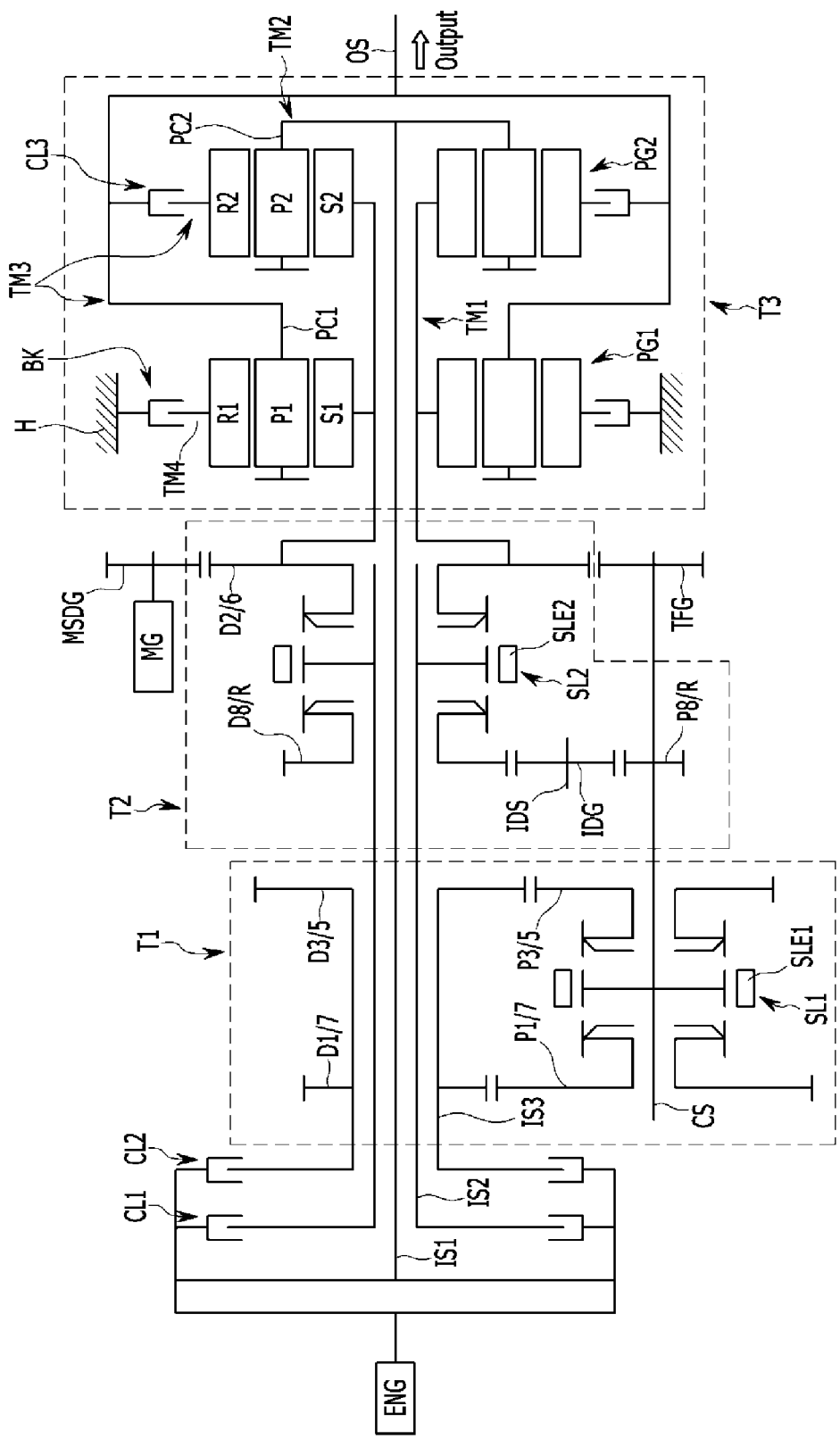
FIG. 1 is a schematic diagram of a power transmission apparatus for a vehicle according to various embodiments of the present invention.

FIG. 1 is a schematic diagram of a power transmission apparatus for a vehicle according to a first exemplary embodiment of the present invention.

Referring to FIG. 1, torque of an engine ENG that is a main power source is changed into four preliminarily shifted torques through an first shifting member T1 and an second shifting member T2 and the four preliminarily shifted torques are transmitted to a third shifting member T3 in a power transmission apparatus according to the first exemplary embodiment of the present invention. The four preliminarily shifted torque, together with the torque of the engine ENG directly input to the third shifting member T3 is changed into eight forward speed stages and a reverse speed stage, and the eight forward speed stages and the reverse speed stage are output.

In addition, a motor/generator MG that is an auxiliary power source is additionally disposed at an input portion of the third shifting member T3 so as to assist torque at every speed stages.

The engine ENG that is the power source may be a gasoline engine or a diesel engine using a fossil fuel.

The torque generated in the engine ENG is transmitted to the third shifting member T3, the second shifting member T2 and the first shifting member T1 through first, second, and third input shafts IS1, IS2, and IS3.

The first input shaft IS1 is directly connected to an output side of the engine ENG and directly transmits torque of the engine ENG to the third shifting member T3.

The second input shaft IS2 is a hollow shaft, encloses the first input shaft IS1 without rotational interference therewith, is selectively connectable to the output side of the engine ENG through a first clutch CL1, and selectively transmits the torque of the engine ENG to the second shifting member T2.

The third input shaft IS3 is a hollow shaft, encloses the second input shaft IS2 without rotational interference therewith, is selectively connectable to the output side of the engine ENG through a second clutch CL2, and selectively transmits the torque of the engine ENG to the first shifting member T1.

The first shifting member T1 includes a 1/7 drive gear D1/7 and a 3/5 drive gear D3/5 fixedly disposed on the third input shaft IS3, a 1/7 driven gear P1/7 disposed on an intermediate shaft CS disposed in parallel with the third input shaft IS3 and engaged with the 1/7 drive gear D1/7, a 3/5 driven gear P3/5 disposed on the intermediate shaft CS and engaged with the 3/5 drive gear D3/5, and a first synchronizer SL1 disposed on the intermediate shaft CS.

The 1/7 driven gear P1/7 and the 3/5 driven gear P3/5 are rotatably disposed on the intermediate shaft CS.

The first synchronizer SL1 operably connects the 1/7 driven gear P1/7 or the 3/5 driven gear P3/5 to the intermediate shaft CS selectively. Therefore, the intermediate shaft CS transmits torque selectively transmitted through the 1/7 driven gear P1/7 or the 3/5 driven gear P3/5 to the second shifting member T2 through a transfer gear TFG fixedly disposed on the intermediate shaft CS. The torque transmitted to the second shifting member T2 is then transmitted to the third shifting member T3.

Therefore, the first shifting member T1 generates a first preliminarily shifted torque for achieving a first forward speed stage and a seventh forward speed stage, and a second preliminarily shifted torque for achieving a third forward speed stage and a fifth forward speed stage.

The second shifting member T2 includes an 8/R drive gear D8/R and a 2/6 drive gear D2/6 disposed on the second input shaft IS2 extended to the rear of the third input shaft IS3, a second synchronizer SL2 disposed on the second input shaft IS2 extended to the rear of the third input shaft IS3, an 8/R driven gear P8/R fixedly disposed on the intermediate shaft CS and operably connected to the 8/R drive gear D8/R, and an idle gear IDG engaged with the 8/R drive gear D8/R and the 8/R driven gear P8/R.

The 8/R drive gear D8/R and the 2/6 drive gear D2/6 are rotatably disposed on the second input shaft IS2, and the idle gear IDG is fixedly disposed on an idle shaft IDS disposed in parallel with the second input shaft IS2. The idle gear IDG causes the 8/R driven gear P8/R and the 8/R drive gear D8/R to rotate in the same direction.

The second synchronizer SL2 operably connects the 8/R drive gear D8/R or the 2/6 drive gear D2/6 to the second input shaft IS2 selectively.

In addition, the transfer gear TFG fixedly disposed on a rear portion of the intermediate shaft CS and engaged with the 2/6 drive gear D2/6 is not concerned in achieving even-numbered speed stages, and transmits the torque transmitted from the first shifting member T1 to the third shifting member T3 through the 2/6 drive gear D2/6.

In addition, the 2/6 drive gear D2/6 transmits torque transmitted from the second input shaft IS2 to the third shifting member T3 without rotation speed change, or changes rotation speed of the second input shaft IS2 according to gear ratios of the transfer gear TFG and the 2/6 drive gear D2/6 engaged with each other and transmits the changed rotation speed to the third shifting member T3.

Therefore, the second shifting member T2 generates a third preliminarily shifted torque for achieving a second forward speed stage and a sixth forward speed stage, and a fourth preliminarily shifted torque for achieving an eighth forward speed stage and a reverse speed stage. Gear ratio at the third preliminarily shifted torque is 1.0. Therefore, the same rotation speed as that of the engine ENG is output at the third preliminarily shifted torque.

The auxiliary power source includes one motor/generator MG, and the motor/generator MG, as well known to a person of an ordinary skill in the art, functions as a motor and a generator.

The motor/generator MG is disposed at the input portion of the third shifting member T3. A motor shaft drive gear MSDG of the motor/generator MG is engaged with the 2/6 drive gear D2/6 of the second shifting member T2 in the first exemplary embodiment of the present invention.

Therefore, in a case of lack of torque input into the third shifting member T3, the motor/generator MG supplies torque additionally and the vehicle can drive with its maximum torque. On the contrary, the motor/generator MG can generate electricity and charge a battery by using the torque of the engine ENG that is the main power source or surplus energy when deceleration or braking.

The third shifting member T3 includes first and second planetary gear sets PG1 and PG2, one clutch CL3 and one brake BK.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof.

Since the first sun gear S1 is directly connected to the second sun gear S1 and the first planet carrier PC1 is selectively connectable to the second ring gear R2, the first and second planetary gear sets PG1 and PG2 include four rotation shafts TM1 to TM4.

The four rotation shafts TM1 to TM4 will be described in detail.

The first rotation shaft TM1 directly connects the first sun gear S1 to the second sun gear S2 and is directly connected to the 2/6 drive gear D2/6.

The second rotation shaft TM2 is directly connected to the second planet carrier PC2 and is directly connected to the first input shaft IS1.

The third rotation shaft TM3 is directly connected to the first planet carrier PC1, is directly connected to the output shaft OS so as to be continuously operated as an output element, and is selectively connectable to the second ring gear R2.

The fourth rotation shaft TM4 is directly connected to the first ring gear R1 and is selectively connectable to a transmission housing H so as to be operated as a selective fixed element.

The first planet carrier PC1 directly connected to the third rotation shaft TM3 is selectively connectable to the second ring gear R2 through the third clutch CL3, and the first ring gear R1 directly connected to the fourth rotation shaft TM4 is selectively connectable to the transmission housing H through the brake BK.

The third clutch CL3 is released when only the first planetary gear set PG1 is concerned with shifting and is operated when both of the first and second planetary gear sets PG1 and PG2 are operated as a compound planetary gear set.

The output shaft OS directly connected to the third rotation shaft TM3 transmits the torque output from the third shifting member T3 to a final speed reduction unit of a differential apparatus.

Since the first and second synchronizers SL1 and SL2 are well known to a person of an ordinary skill in the art, detailed description thereof will be omitted. In addition, first and second sleeves SLE1 and SLE2 applied respectively to the first and second synchronizers SL1 and SL2, as well known to a person of an ordinary skill in the art, are operated by additional actuators and the actuators are controlled by a transmission control unit.

Figure 3:
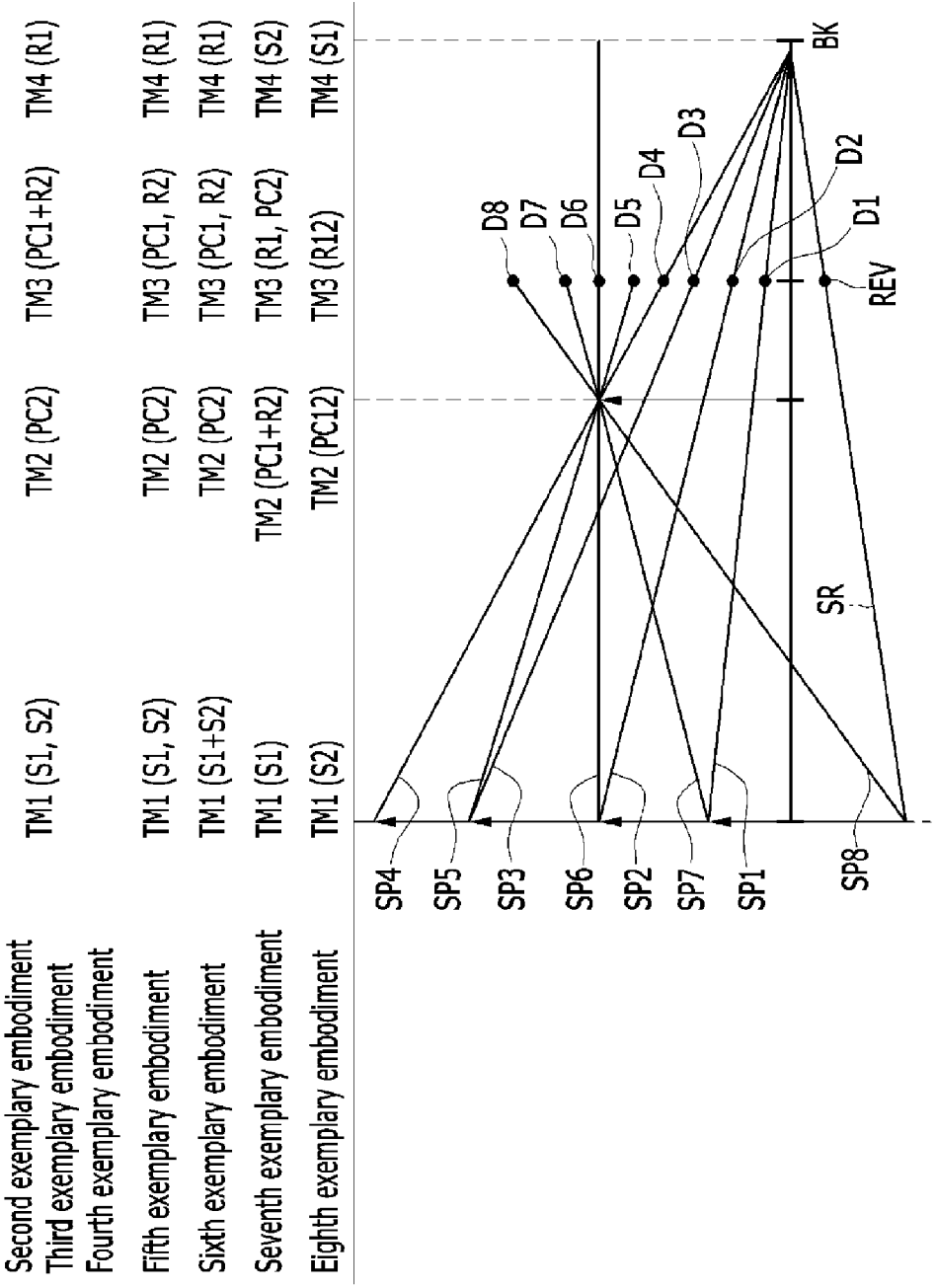
FIG. 3 is a lever diagram of a power transmission apparatus for a vehicle according to various embodiments of the present invention.

FIG. 2 is an operational chart of a power transmission apparatus for a vehicle according to the first exemplary embodiment of the present invention, and FIG. 3 is a lever diagram of a power transmission apparatus for a vehicle according to the first exemplary embodiment of the present invention. Referring to FIG. 2 and FIG. 3, shifting processes of the power transmission apparatus will be described in detail.

The third clutch CL3 is not operated and only the first planetary gear set PG1 is concerned with the shifting at the first to the fourth forward speed stages and the reverse speed stage. On the contrary, the third clutch CL3 is operated and both of the first and second planetary gear sets PG1 and PG2 are concerned with the shifting as the compound planetary gear set at the forward fourth to the eighth forward speed stages.

[Reverse Speed Stage]

As shown in FIG. 2, the 8/R drive gear D8/R is operably connected to the second input shaft IS2 through the sleeve SLE2 of the second synchronizer SL2 and the first clutch CL1 and the brake BK are operated at the reverse speed stage REV.

Therefore, the torque of the engine ENG is shifted into the fourth preliminarily shifted torque through the first clutch CL1, the second input shaft IS2, the 8/R drive gear D8/R, the idle gear IDG, the 8/R driven gear P8/R, the intermediate shaft CS, the transfer gear TFG, and the 2/6 drive gear D2/6, and the fourth preliminarily shifted torque is input to the first rotation shaft TM1 of the third shifting member T3 as inverse rotation speed.

As shown in FIG. 3, since the fourth rotation shaft TM4 is operated as a fixed element by operation of the brake BK in a state that the fourth preliminarily shifted torque is input to the first rotation shaft TM1, a reverse shift line SR is formed in the third shifting member T3. Therefore, a gear ratio of REV is output through the third rotation shaft TM3 that is an output member.

[First Forward Speed Stage]

As shown in FIG. 2, the 1/7 driven gear P1/7 is operably connected to the intermediate shaft CS through the sleeve SLE1 of the first synchronizer SL1, and the second clutch CL2 and the brake BK are operated at the first forward speed stage D1.

Therefore, the torque of the engine ENG is shifted into the first preliminarily shifted torque through the second clutch CL2, the third input shaft IS3, the 1/7 drive gear D1/7, the 1/7 driven gear P1/7, the intermediate shaft CS, the transfer gear TFG, and the 2/6 drive gear D2/6, and the first preliminarily shifted torque is input to the first rotation shaft TM1 of the third shifting member T3.

As shown in FIG. 3, since the fourth rotation shaft TM4 is operated as the fixed element by operation of the brake BK in a state that the first preliminarily shifted torque is input to the first rotation shaft TM1, a first shift line SP1 is formed in the third shifting member T3. Therefore, a gear ratio of D1 is output through the third rotation shaft TM3 that is the output member.

[Second Forward Speed Stage]

As shown in FIG. 2, the 2/6 drive gear D2/6 is operably connected to the second input shaft IS2 through the sleeve SLE2 of the second synchronizer SL2, and the first clutch CL1 and the brake BK are operated at the second forward speed stage D2.

Therefore, the torque of the engine ENG is shifted into the third preliminarily shifted torque through the first clutch CL1, the second input shaft IS2, and the 2/6 drive gear D2/6, and the third preliminarily shifted torque is input to the first rotation shaft TM1 of the third shifting member T3.

As shown in FIG. 3, since the fourth rotation shaft TM4 is operated as the fixed element by operation of the brake BK in a state that the third preliminarily shifted torque is input to the first rotation shaft TM1, a second shift line SP2 is formed in the third shifting member T3. Therefore, a gear ratio of D2 is output through the third rotation shaft TM3 that is the output member.

[Third Forward Speed Stage]

As shown in FIG. 2, the 3/5 driven gear P3/5 is operably connected to the intermediate shaft CS through the sleeve SLE1 of the first synchronizer SL1, and the second clutch CL2 and the brake BK are operated at the third forward speed stage D3.

Therefore, the torque of the engine ENG is shifted into the second preliminarily shifted torque through the second clutch CL2, the third input shaft IS3, the 3/5 drive gear D3/5, the 3/5 driven gear P3/5, the intermediate shaft CS, the transfer gear TFG, and the 2/6 drive gear D2/, and the second preliminarily shifted torque is input to the first rotation shaft TM1 of the third shifting member T3.

As shown in FIG. 3, since the fourth rotation shaft TM4 is operated as the fixed element by operation of the brake BK in a state that the second preliminarily shifted torque is input to the first rotation shaft TM1, a third shift line SP3 is formed in the third shifting member T3. Therefore, a gear ratio of D3 is output through the third rotation shaft TM3 that is the output member.

[Forward Fourth Speed Shift-Stage]

As shown in FIG. 2, both of the first and second synchronizers SL1 and SL2 maintain neutral states, and the third clutch CL3 and the brake BK are operated at the forward fourth speed shift-stage D4. In this case, the first and second planetary gear sets PG1 and PG2 are operated as the compound planetary gear set.

Since the torque of the engine ENG is input to the second rotation shaft TM2 through the first input shaft IS1 and the fourth rotation shaft TM4 is operated as the fixed element by operation of the brake BK, a fourth shift line SP4 is formed in the third shifting member T3. Therefore, a gear ratio of D4 is output through the third rotation shaft TM3 that is the output member.

[Fifth Forward Speed Stage]

As shown in FIG. 2, the 3/5 driven gear P3/5 is operably connected to the intermediate shaft CS through the sleeve SLE1 of the first synchronizer SL1, and the second clutch CL2 and the third clutch CL3 are operated at the fifth forward speed stage D5.

Therefore, the torque of the engine ENG is shifted into the second preliminarily shifted torque through the second clutch CL2, the third input shaft IS3, the 3/5 drive gear D3/5, the 3/5 driven gear P3/5, the intermediate shaft CS, the transfer gear TFG, and the 2/6 drive gear D2/6, and the second preliminarily shifted torque is input to the first rotation shaft TM1 of the third shifting member T3.

In addition, the torque of the engine ENG is input to the second rotation shaft TM2 of the third shifting member T3 through the first input shaft IS1.

As shown in FIG. 3, since the second preliminarily shifted torque is input to the first rotation shaft TM1 and the torque of the engine ENG is input to the second rotation shaft TM2, a fifth shift line SP5 is formed in the third shifting member T3. Therefore, a gear ratio of D5 is output through the third rotation shaft TM3 that is the output member.

[Sixth Forward Speed Stage]

As shown in FIG. 2, the 2/6 drive gear D2/6 is operably connected to the second input shaft IS2 through the sleeve SLE2 of the second synchronizer SL2, and the first clutch CL1 and the third clutch CL3 are operated at the sixth forward speed stage D6.

Therefore, the torque of the engine ENG is shifted into the third preliminarily shifted torque through the first clutch CL1, the second input shaft IS2, and the 2/6 drive gear D2/6, and the third preliminarily shifted torque is input to the first rotation shaft TM1 of the third shifting member T3.

In addition, the torque of the engine ENG is input to the second rotation shaft TM2 of the third shifting member T3 through the first input shaft IS1.

As shown in FIG. 3, since the third preliminarily shifted torque is input to the first rotation shaft TM1 and the torque of the engine ENG is input to the second rotation shaft TM2, the first and second planetary gear sets PG1 and PG2 integrally or monolitcally rotate and a sixth shift line SP6 is formed in the third shifting member T3. Therefore, a gear ratio of D6 is output through the third rotation shaft TM3 that is the output member.

[Seventh Forward Speed Stage]

As shown in FIG. 2, the 1/7 driven gear P1/7 is operably connected to the intermediate shaft CS through the sleeve SLE1 of the first synchronizer SL1, and the second clutch CL2 and the third clutch CL3 are operated at the seventh forward speed stage D7.

Therefore, the torque of the engine ENG is shifted into the first preliminarily shifted torque through the second clutch CL2, the third input shaft IS3, the 1/7 drive gear D1/7, the 1/7 driven gear P1/7, the intermediate shaft CS, the transfer gear TFG, and the 2/6 drive gear D2/6, and the first preliminarily shifted torque is input to the first rotation shaft TM1 of the third shifting member T3.

In addition, the torque of the engine ENG is input to the second rotation shaft TM2 of the third shifting member T3 through the first input shaft IS1.

As shown in FIG. 3, since the first preliminarily shifted torque is input to the first rotation shaft TM1 and the torque of the engine ENG is input to the second rotation shaft TM2, a seventh shift line SP7 is formed in the third shifting member T3. Therefore, a gear ratio of D7 is output through the third rotation shaft TM3 that is the output member.

[Eight Forward Speed Stages]

As shown in FIG. 2, the 8/R drive gear D8/R is operably connected to the second input shaft IS2 through the sleeve SLE2 of the second synchronizer SL2, and the first clutch CL1 and the third clutch CL3 are operated at the eight forward speed stages D8.

Therefore, the torque of the engine ENG is shifted into the fourth preliminarily shifted torque through the first clutch CL1, the second input shaft IS2, the 8/R drive gear D8/R, the idle gear IDG, the 8/R driven gear P8/R, the intermediate shaft CS, the transfer gear TFG, and the 2/6 drive gear D2/6, and the fourth preliminarily shifted torque is input to the first rotation shaft TM1 of the third shifting member T3 as the inverse rotation speed.

In addition, the torque of the engine ENG is input to the second rotation shaft TM2 of the third shifting member T3 through the first input shaft IS1.

As shown in FIG. 3, since the fourth preliminarily shifted torque is input to the first rotation shaft TM1 and the torque of the engine ENG is input to the second rotation shaft TM2, an eighth shift line SP8 is formed in the third shifting member T3. Therefore, a gear ratio of D8 is output through the third rotation shaft TM3 that is the output member.

The motor/generator MG can assist torque to the torque input to the third shifting member T3 at every speed stages, or the motor/generator MG can generate electricity and charge the battery by using the torque of the engine ENG that is the main power source or the surplus energy when deceleration or braking.

The power transmission apparatus for a vehicle according to the first exemplary embodiment of the present invention may achieve the reverse speed stage and eight forward speed stages by adding two planetary gear sets to a DCT provided with two synchronizers. Therefore, multiple speed stages may be achieved and fuel economy may be improved.

In addition, an interior layout may be simplified, length and weight of the DCT may be minimized by reducing the number of components.

In addition, since even-numbered speed stages and odd-numbered speed stages are achieved by turns by alternately operating two clutches, smooth shift may be achieved.

In addition, torque can be assisted at every speed stages by using the motor/generator that is the auxiliary power source.

Figure 4:
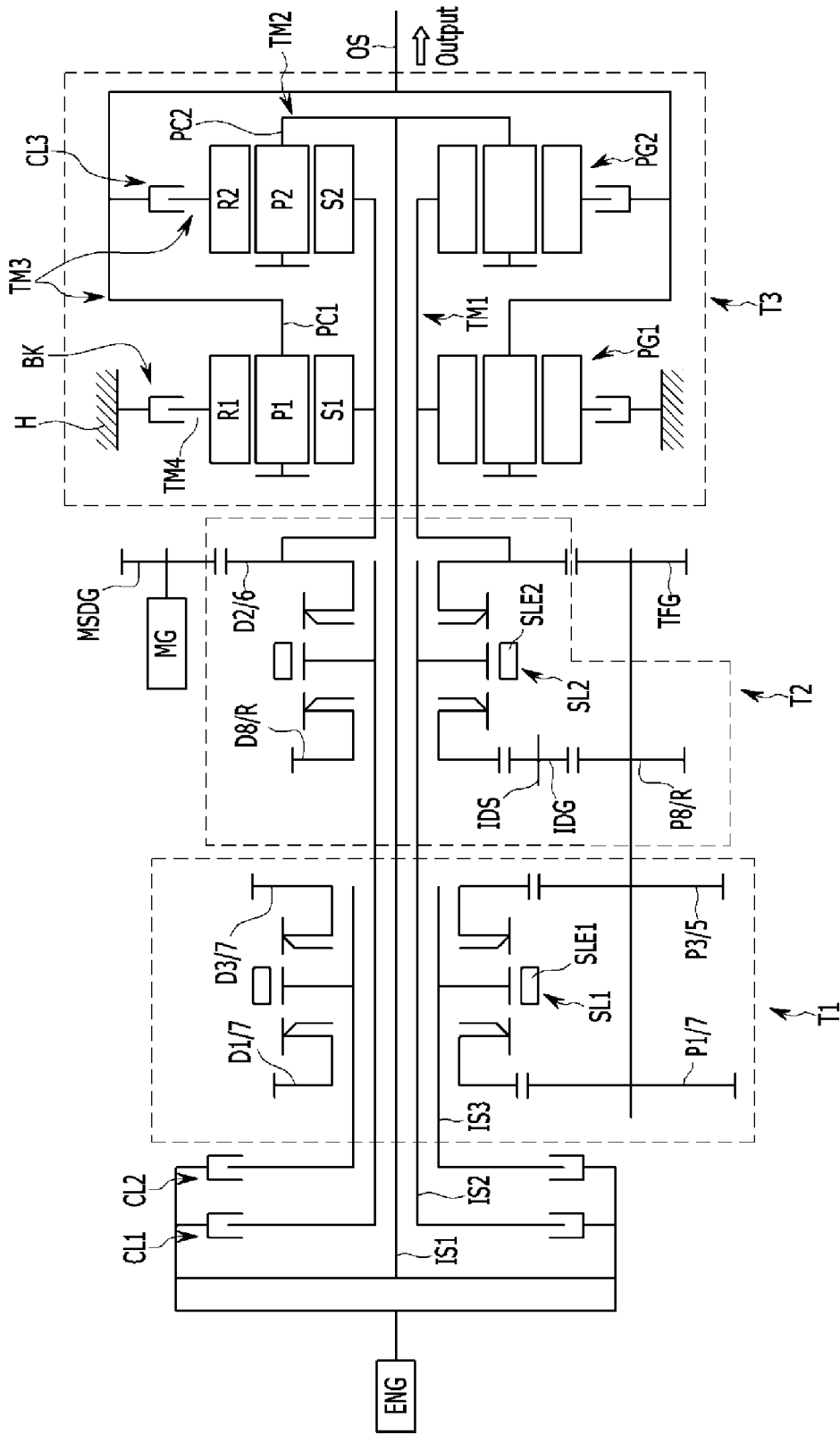
FIG. 4 is a schematic diagram of a power transmission apparatus for a vehicle according to various embodiments of the present invention.

FIG. 4 is a schematic diagram of a power transmission apparatus for a vehicle according to a second exemplary embodiment of the present invention.

Referring to FIG. 4, the first synchronizer SL1 included in the first shifting member T1 is disposed on the intermediate shaft CS in the power transmission apparatus for a vehicle according to the first exemplary embodiment of the present invention, the first synchronizer SL1 is disposed on the third input shaft IS3 according to the second exemplary embodiment.

Therefore, the 1/7 drive gear D1/7 and the 3/5 drive gear D3/5 are rotatably disposed on the third input shaft IS3, and the first synchronizer SL1 operably connects the 1/7 drive gear D1/7 or the 3/5 drive gear D3/5 to the third input shaft IS3 selectively. In addition, the 1/7 driven gear P1/7 engaged to the 1/7 drive gear D1/7, and the 3/5 driven gear P3/5 engaged to the 3/5 drive gear D3/5 are fixedly disposed on the intermediate shaft CS.

The constituent elements and shifting processes according to the second exemplary embodiment of the present invention are the same as those according to the first exemplary embodiment except arrangements of the first synchronizer SL1 and the drive gears and the driven gears related thereto. Therefore, detailed description thereof will be omitted.

Figure 5:
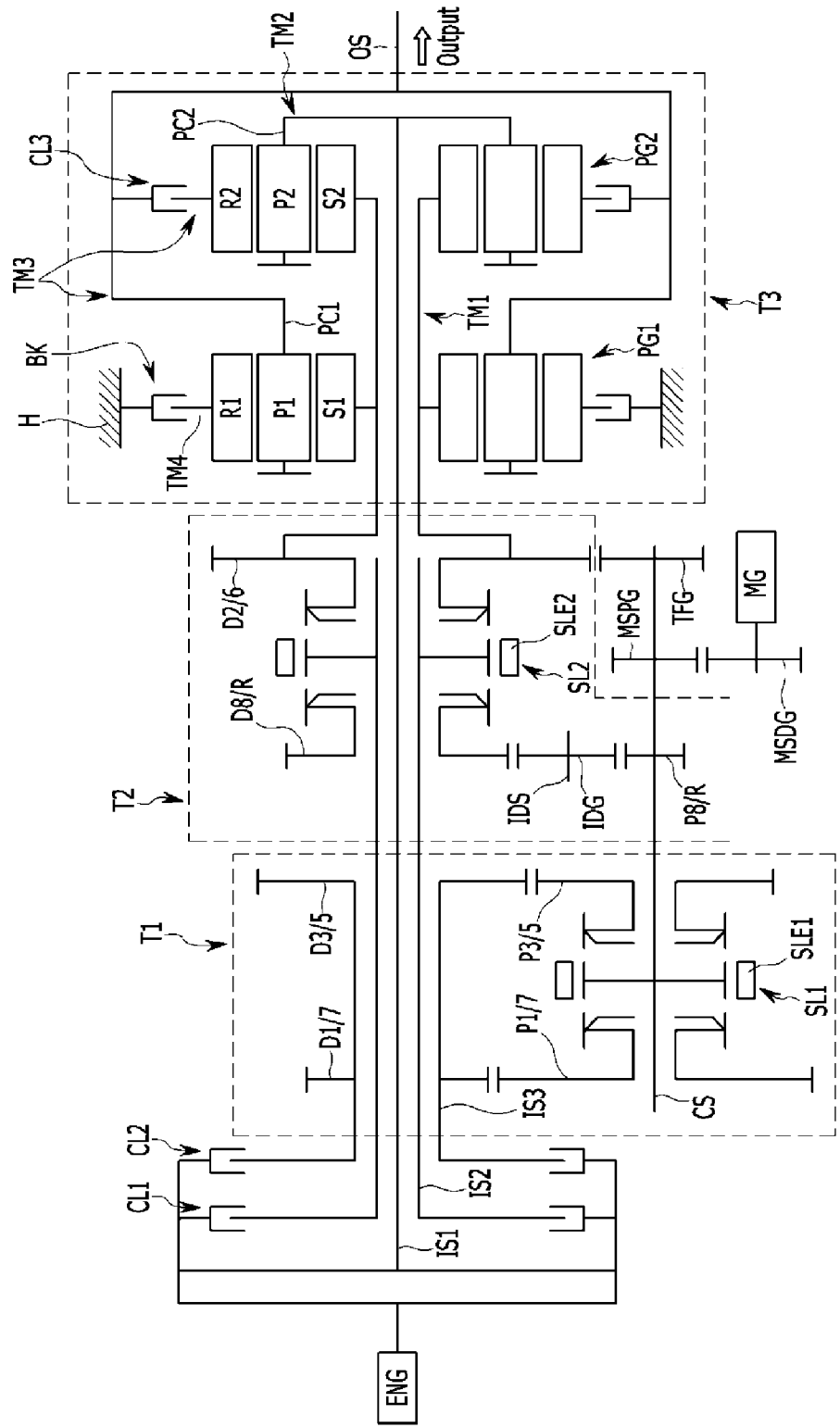
FIG. 5 is a schematic diagram of a power transmission apparatus for a vehicle according to various embodiments of the present invention.

FIG. 5 is a schematic diagram of a power transmission apparatus for a vehicle according to a third exemplary embodiment of the present invention.

Referring to FIG. 5, the motor shaft drive gear MSDG of the motor/generator MG is engaged with the 2/6 drive gear D2/6 of the second shifting member T2 in the first and second exemplary embodiments of the present invention, but the motor shaft driven gear MSPG is fixedly disposed on the intermediate shaft CS and the motor shaft drive gear MSDG is engaged with the motor shaft driven gear MSPG in the third exemplary embodiment of the present invention.

The other constituent elements and shifting processes according to the third exemplary embodiment of the present invention are the same as those according to the first and second exemplary embodiments except connection between the motor shaft drive gear MSDG and the motor shaft driven gear MSPG. Therefore, detailed description thereof will be omitted.

Figure 6:
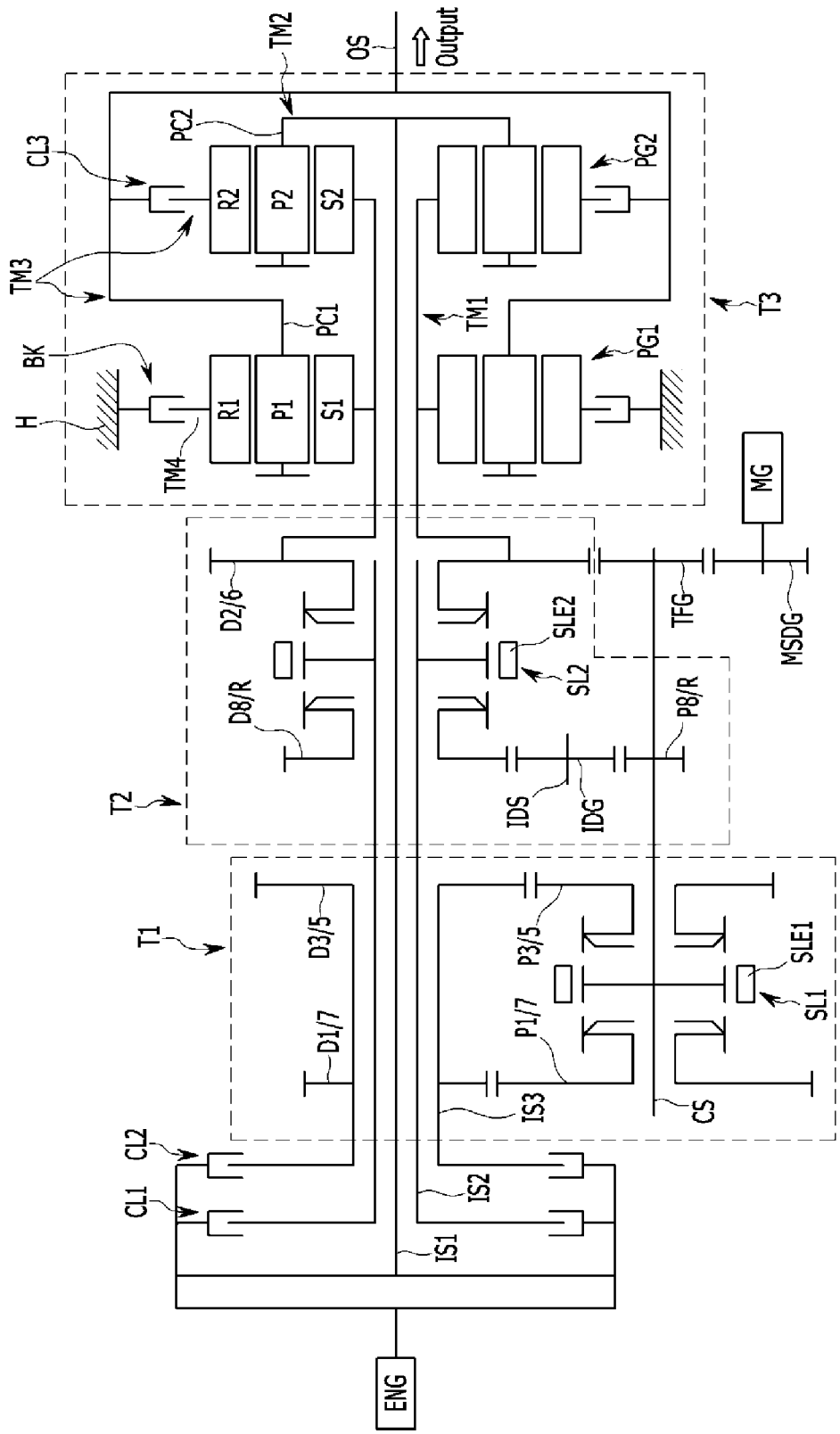
FIG. 6 is a schematic diagram of a power transmission apparatus for a vehicle according to various embodiments of the present invention.

FIG. 6 is a schematic diagram of a power transmission apparatus for a vehicle according to a fourth exemplary embodiment of the present invention.

Referring to FIG. 6, the motor shaft drive gear MSDG of the motor/generator MG is engaged with the 2/6 drive gear D2/6 of the second shifting member T2 in the first and second exemplary embodiments of the present invention, but the motor shaft drive gear MSDG of the motor/generator MG is engaged with the transfer gear TFG fixedly disposed on the intermediate shaft CS in the fourth exemplary embodiment of the present invention.

The other constituent elements and shifting processes according to the fourth exemplary embodiment of the present invention are the same as those according to the first and second exemplary embodiments except connection between the motor shaft drive gear MSDG and the transfer gear TFG. Therefore, detailed description thereof will be omitted.

Figure 7:
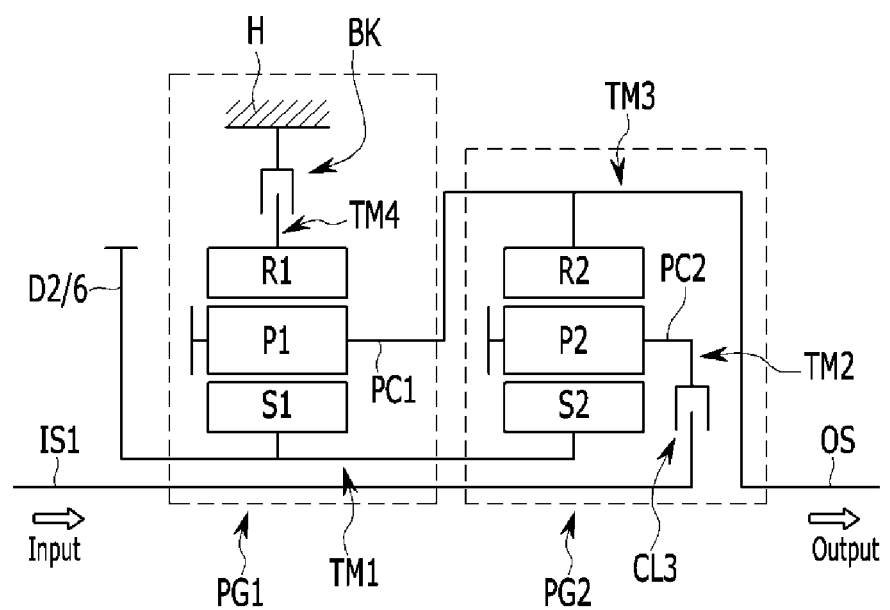
FIG. 7 is a schematic diagram of a compound shifting portion of a power transmission apparatus for a vehicle according to various embodiments of the present invention.

FIG. 7 is a schematic diagram of a third shifting member of a power transmission apparatus for a vehicle according to the fifth exemplary embodiment of the present invention.

Referring to FIG. 7, the first sun gear S1 is directly connected to the second sun gear S2 and the first planet carrier PC1 is selectively connectable to the second ring gear R2 such that the first and second planetary gear sets PG1 and PG2 being single pinion planetary gear sets include four rotation shafts TM1 to TM4 in the third shifting member T3 according to the first exemplary embodiment of the present invention, but the first sun gear S1 is directly connected to the second sun gear S2 and the first planet carrier PCI is directly connected to the second ring gear R2 such that the first and second planetary gear sets PG1 and PG2 being the single pinion planetary gear sets include four rotation shafts TM1 to TM4 in the fifth exemplary embodiment.

The four rotation shafts TM1 to TM4 of the third shifting member T3 according to the fifth exemplary embodiment of the present invention will be described in detail.

The first rotation shaft TM1 directly connects the first sun gear S1 to the second sun gear S2 and is directly connected to the 2/6 drive gear D2/6.

The second rotation shaft TM2 is directly connected to the second planet carrier PC2 and is selectively connectable to the first input shaft IS1 so as to be operated as a selective input element.

The third rotation shaft TM3 directly connects the first planet carrier PCI to the second ring gear R2 and is directly connected to the output shaft OS so as to be operated as the output element.

The fourth rotation shaft TM4 is directly connected to the first ring gear R1 and is selectively connectable to the transmission housing H so as to be operated as a selective fixed element.

In addition, the third clutch CL3 is disposed between the first input shaft IS1 and the second planet carrier PC2 directly connected to the second rotation shaft TM2, and the brake BK is disposed between the first ring gear R1 directly connected to the fourth rotation shaft TM4 and the transmission housing H.

The constituent elements of the third shifting member T3 and shifting processes according to the fifth exemplary embodiment are the same as those according to the first exemplary embodiment except the rotation shafts and the rotation elements connected to the frictional elements. Therefore, detailed description thereof will be omitted.

Figure 8:
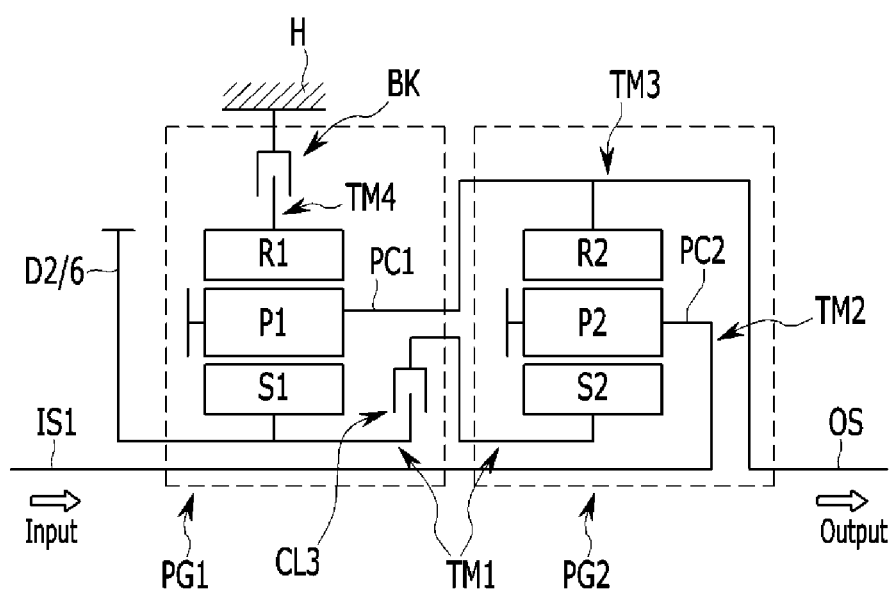
FIG. 8 is a schematic diagram of a compound shifting portion of a power transmission apparatus for a vehicle according to various embodiments of the present invention.

FIG. 8 is a schematic diagram of a third shifting member of a power transmission apparatus for a vehicle according to a sixth exemplary embodiment of the present invention.

Referring to FIG. 8, the first sun gear S1 is directly connected to the second sun gear S2 and the first planet carrier PC1 is selectively connectable to the second ring gear R2 such that the first and second planetary gear sets PG1 and PG2 being single pinion planetary gear sets include four rotation shafts TM1 to TM4 in the third shifting member T3 according to the first exemplary embodiment of the present invention, but the first planet carrier PC1 is directly connected to the second ring gear R2 and the first sun gear S1 is selectively connectable to the second sun gear S1 such that the first and second planetary gear sets PG1 and PG2 being the single pinion planetary gear sets include four rotation shafts TM1 to TM4 in the sixth exemplary embodiment.

The four rotation shafts TM1 to TM4 of the third shifting member T3 according to the sixth exemplary embodiment of the present invention will be described in detail.

The first rotation shaft TM1 is directly connected to the first sun gear S1, is directly connected to the 2/6 drive gear D2/6, and is selectively connectable to the second sun gear S2.

The second rotation shaft TM2 is directly connected to the second planet carrier PC2 and is directly connected to the first input shaft IS1.

The third rotation shaft TM3 directly connects the first planet carrier PC1 to the second ring gear R2 and is directly connected to the output shaft OS so as to be operated as the output element.

The fourth rotation shaft TM4 is directly connected to the first ring gear R1 and is selectively connectable to the transmission housing H so as to be operated as the selective fixed element.

In addition, the third clutch CL3 is disposed between the first sun gear S1 and the second sun gear S2, and the brake BK is disposed between the first ring gear R1 and the transmission housing H.

The constituent elements of the third shifting member T3 and shifting processes according to the sixth exemplary embodiment are the same as those according to the first exemplary embodiment except the rotation shafts and the rotation elements connected to the frictional elements. Therefore, detailed description thereof will be omitted.

Figure 9:
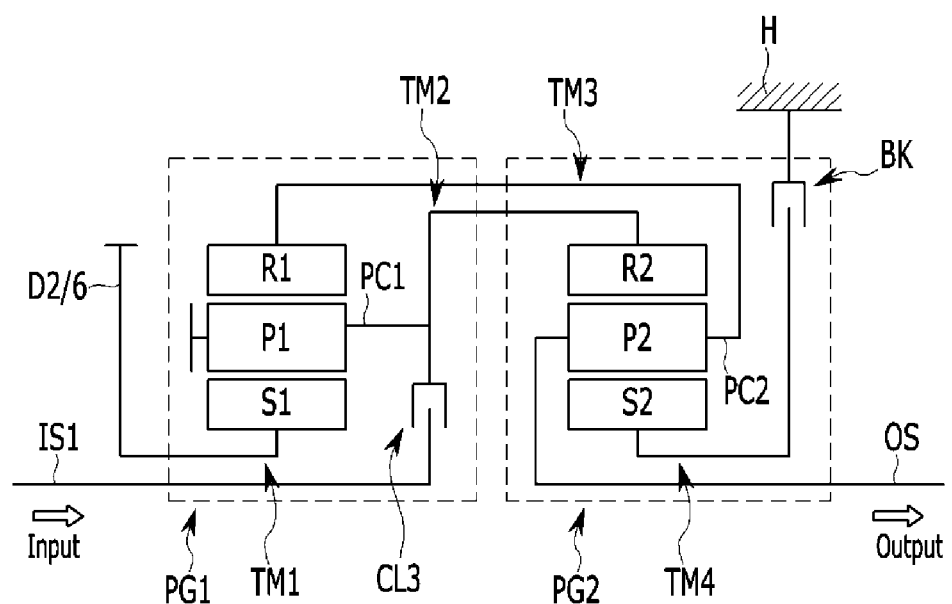
FIG. 9 is a schematic diagram of a compound shifting portion of a power transmission apparatus for a vehicle according to various embodiments of the present invention.

FIG. 9 is a schematic diagram of a compound shifting portion of a power transmission apparatus for a vehicle according to a seventh exemplary embodiment of the present invention.

Referring to FIG. 9, the first sun gear S1 is directly connected to the second sun gear S2 and the first planet carrier PC1 is selectively connectable to the second ring gear R2 such that the first and second planetary gear sets PG1 and PG2 being single pinion planetary gear sets include four rotation shafts TM1 to TM4 in the third shifting member T3 according to the first exemplary embodiment of the present invention, but the first planet carrier PC1 is directly connected to the second ring gear R2 and the first ring gear R1 is directly connected to the second planet carrier PC2 such that the first and second planetary gear sets PG1 and PG2 being the single pinion planetary gear sets include four rotation shafts TM1 to TM4 in the seventh exemplary embodiment.

The four rotation shafts TM1 to TM4 of the third shifting member T3 according to the seventh exemplary embodiment of the present invention will be described in detail.

The first rotation shaft TM1 is directly connected to the first sun gear S1 and is directly connected to the 2/6 drive gear D2/6.

The second rotation shaft TM2 directly connects the first planet carrier PC1 to the second ring gear R2 and is selectively connectable to the first input shaft IS1.

The third rotation shaft TM3 directly connects the first ring gear R1 to the second planet carrier PC2 and is directly connected to the output shaft OS so as to be operated as the output element.

The fourth rotation shaft TM4 is directly connected to the second sun gear S2 and is selectively connectable to the transmission housing H so as to be operated as the selective fixed element.

In addition, the third clutch CL3 is disposed between the first input shaft IS1 and the second rotation shaft TM2, and the brake BK is disposed between the fourth rotation shaft TM4 and the transmission housing H.

The constituent elements of the third shifting member T3 and shifting processes according to the seventh exemplary embodiment are the same as those according to the first exemplary embodiment except the rotation shafts and the rotation elements connected to the frictional elements. Therefore, detailed description thereof will be omitted.

Figure 10:
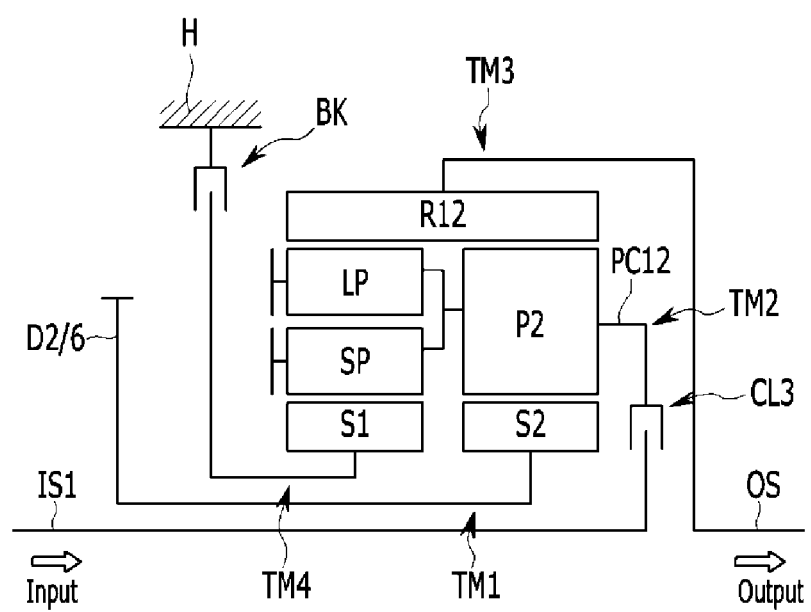
FIG. 10 is a schematic diagram of a compound shifting portion of a power transmission apparatus for a vehicle according to various embodiments of the present invention.

FIG. 10 is a schematic diagram of a third shifting member of a power transmission apparatus for a vehicle according to an eighth exemplary embodiment of the present invention.

Referring to FIG. 10, the first sun gear S1 is directly connected to the second sun gear S2 and the first planet carrier PC1 is selectively connectable to the second ring gear R2 such that the first and second planetary gear sets PG1 and PG2 being single pinion planetary gear sets include four rotation shafts TM1 to TM4 in the third shifting member T3 according to the first exemplary embodiment of the present invention, but a compound planetary gear set of Ravingneaux type in which a double pinion planetary gear set and a single pinion planetary gear set are combined with each other and a planet carrier and a ring gear are used in common is used to include four rotation shafts TM1 to TM4 in the eighth exemplary embodiment.

The four rotation shafts TM1 to TM4 of the third shifting member T3 according to the eighth exemplary embodiment of the present invention will be described in detail.

The first rotation shaft TM1 is directly connected to the second sun gear S2 and is directly connected to the 2/6 drive gear D2/6.

The second rotation shaft TM2 is directly connected to a common planet carrier PC12 and is selectively connectable to the first input shaft IS1.

The third rotation shaft TM3 is directly connected to a common ring gear R12 and is directly connected to the output shaft OS so as to be operated as the output element.

The fourth rotation shaft TM4 is directly connected to the first sun gear S1 and is selectively connectable to the transmission housing H so as to be operated as the selective fixed element.

In addition, the third clutch CL3 is disposed between the first input shaft IS1 and the second rotation shaft TM2, and the brake BK is disposed between the fourth rotation shaft TM4 and the transmission housing H.

The constituent elements of the third shifting member T3 and shifting processes according to the eighth exemplary embodiment are the same as those according to the first exemplary embodiment except the rotation shafts and the rotation elements connected to the frictional elements. Therefore, detailed description thereof will be omitted.

The third shifting member T3 illustrated in FIG. 7 to FIG. 10 can be replaceable as the third shifting member T3 illustrated in FIG. 3 to FIG. 6.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus for a vehicle comprising:
    a first input shaft connected to an engine;
    a second input shaft surrounding the first input shaft without rotational interference with the first input shaft and selectively receiving torque of the engine through a first clutch;
    a third input shaft surrounding the second input shaft without rotational interference with the second input shaft and selectively receiving the torque of the engine through a second clutch;
    an intermediate shaft disposed in parallel with the first, second, and third input shafts;
    a transfer gear fixedly disposed on the intermediate shaft and outputting torque of the intermediate shaft;
    a first shifting member receiving the torque of the engine from the third input shaft, changing the torque of the engine into first and second preliminarily shifted torques, and outputting the first and second preliminarily shifted torques;
    a second shifting member receiving the torque of the engine from the second input shaft, changing the torque of the engine into third and fourth preliminarily shifted torques, and outputting the third and fourth preliminarily shifted torques;
    a third shifting member changing the torque of the engine directly transmitted from the first input shaft and the first preliminarily shifted torque to the fourth preliminarily shifted torque selectively transmitted from the first shifting member or the second shifting member into eight forward speed stage stages and one reverse speed stage, and outputting the eight forward speed stage stages and the one reverse speed stage; and
    an auxiliary power source disposed on a supply of the torque transmitted from the first shifting member and the second shifting member to the third shifting member and supplying torque to the third shifting member.

2. The power transmission apparatus of claim 1, wherein the first shifting member comprises:
    a 1/7 drive gear and a 3/5 drive gear fixedly disposed on the third input shaft;
    a 1/7 driven gear rotatably disposed on the intermediate shaft and engaged with the 1/7 drive gear;
    a 3/5 driven gear rotatably disposed on the intermediate shaft and engaged with the 3/5 drive gear; and
    a first synchronizer operably connecting at least one of the 1/7 driven gear and the 3/5 driven gear to the intermediate shaft selectively.

3. The power transmission apparatus of claim 1, wherein the first shifting member comprises:
    a 1/7 drive gear and a 3/5 drive gear rotatably disposed on the third input shaft;
    a first synchronizer operably connecting at least one of the 1/7 drive gear and the 3/5 drive gear to the third input shaft selectively;
    a 1/7 driven gear fixedly disposed on the intermediate shaft and engaged with the 1/7 drive gear; and
    a 3/5 driven gear fixedly disposed on the intermediate shaft and engaged with the 3/5 drive gear.

4. The power transmission apparatus of claim 1, wherein the second shifting member comprises:
    an 8/R drive gear rotatably disposed on the second input shaft;
    a 2/6 drive gear rotatably disposed on the second input shaft and engaged with the transfer gear on the intermediate shaft;
    a second synchronizer operably connecting the 8/R drive gear or the 2/6 drive gear to the second input shaft selectively; and
    an 8/R driven gear fixedly disposed on the intermediate shaft and operably connected to the 8/R drive gear through an idle gear.

5. The power transmission apparatus of claim 4, wherein the auxiliary power source includes a motor/generator having a motor shaft drive gear and the motor shaft drive gear is engaged with the 2/6 drive gear of the second shifting member.

6. The power transmission apparatus of claim 4, wherein the auxiliary power source includes a motor/generator having a motor shaft drive gear and a motor shaft driven gear, and the motor shaft drive gear is engaged with the motor shaft driven gear fixedly disposed on the intermediate shaft.

7. The power transmission apparatus of claim 4, wherein the auxiliary power source includes a motor/generator having a motor shaft drive gear and the motor shaft drive gear is engaged with the transfer gear fixedly disposed on the intermediate shaft.

8. The power transmission apparatus of claim 1, wherein the third shifting member comprises:
a first planetary gear set including a first sun gear, a first planet carrier, and a first ring gear as first, second, third rotation elements thereof;
a second planetary gear set including a second sun gear, a second planet carrier, and a second ring gear as fourth, fifth, and sixth rotation elements thereof;
four rotation shafts directly connected to at least one rotation element among the first, second, third, fourth, fifth, and sixth rotation elements of the first planetary gear set and the second planetary gear set; and
frictional elements, at least one of the frictional elements selectively connecting at least one rotation shaft among the four rotation shafts to the first input shaft or selectively connecting one rotation element of the first planetary gear set to one rotation element of the second planetary gear set, and another of the frictional elements selectively connecting another rotation shaft among the four rotation shafts to a transmission housing.

9. The power transmission apparatus of claim 8, wherein each of the first planetary gear set and the second planetary gear set is a single pinion planetary gear set, and
wherein the four rotation shafts comprise:
a first rotation shaft connecting the first sun gear with the second sun gear and receiving torque from the first shifting member and the second shifting member;
a second rotation shaft connected to the second planet carrier and connected to the first input shaft;
a third rotation shaft connected to the first planet carrier, connected to an output shaft, and selectively connectable to the second ring gear; and
a fourth rotation shaft connected to the first ring gear and selectively connectable to the transmission housing.

10. The power transmission apparatus of claim 9, wherein the frictional elements comprise:
a third clutch disposed between the first planet carrier and the second ring gear; and
a brake disposed between the fourth rotation shaft and the transmission housing.

11. The power transmission apparatus of claim 8, wherein each of the first planetary gear set and the second planetary gear set is a single pinion planetary gear set, and
wherein the four rotation shafts comprise:
a first rotation shaft connecting the first sun gear to the second sun gear and receiving torque from the first shifting member and the second shifting member;
a second rotation shaft connected to the second planet carrier and selectively connectable to the first input shaft;
a third rotation shaft connecting the first planet carrier to the second ring gear and connected to an output shaft; and
a fourth rotation shaft connected to the first ring gear and selectively connectable to the transmission housing.

12. The power transmission apparatus of claim 11, wherein the frictional elements comprise:
a third clutch disposed between the first input shaft and the second rotation shaft; and
a brake disposed between the fourth rotation shaft and the transmission housing.

13. The power transmission apparatus of claim 8, wherein each of the first planetary gear set and the second planetary gear set is a single pinion planetary gear set, and
wherein the four rotation shafts comprise:
a first rotation shaft connected to the first sun gear, selectively connectable to the second sun gear, and receiving torque from the first shifting member and the second shifting member;
a second rotation shaft connected to the second planet carrier and connected to the first input shaft;
a third rotation shaft connecting the first planet carrier to the second ring gear and connected to an output shaft; and
a fourth rotation shaft connected to the first ring gear and selectively connectable to the transmission housing.

14. The power transmission apparatus of claim 13, wherein the frictional elements comprise:
a third clutch disposed between the first sun gear and the second sun gear; and
a brake disposed between the fourth rotation shaft and the transmission housing.

15. The power transmission apparatus of claim 8, wherein each of the first planetary gear set and the second planetary gear set is a single pinion planetary gear set, and
wherein the four rotation shafts comprise:
a first rotation shaft connected to the first sun gear and receiving torque from the first shifting member and the second shifting member;
a second rotation shaft connecting the first planet carrier to the second ring gear and selectively connectable to the first input shaft;
a third rotation shaft connecting the first ring gear to the second planet carrier and connected to an output shaft; and
a fourth rotation shaft connected to the second sun gear and selectively connectable to the transmission housing.

16. The power transmission apparatus of claim 15, wherein the frictional elements comprise:
a third clutch disposed between the first input shaft and the second rotation shaft; and
a brake disposed between the fourth rotation shaft and the transmission housing.

17. The power transmission apparatus of claim 1, wherein the third shifting member is a Ravingneaux compound planetary gear set in which a single pinion planetary gear set and a double pinion planetary gear set are combined with each other to use a planet carrier and a ring gear in common, and
wherein the third shifting member comprises:
four rotation shafts; and
frictional elements, at least one of the frictional elements selectively connecting at least one rotation shaft among the four rotation shafts to the first input shaft, and another of the frictional elements selectively connecting another rotation shaft among the four rotation shafts to a transmission housing.

18. The power transmission apparatus of claim 17, wherein the four rotation shafts comprise:
   a first rotation shaft connected to a sun gear of the single pinion planetary gear set and receiving torque from the first shifting member and the second shifting member;
   a second rotation shaft connected to a common planet carrier and selectively connectable to the first input shaft;
   a third rotation shaft connected to a common ring gear and connected to an output shaft; and
   a fourth rotation shaft connected to a sun gear of the double pinion planetary gear set and selectively connectable to the transmission housing.

19. The power transmission apparatus of claim 18, wherein the frictional elements comprise:
   a third clutch disposed between the first input shaft and the second rotation shaft; and
   a brake disposed between the fourth rotation shaft and the transmission housing.

\* \* \* \* \*